INVENTOR.
Paul Herbert Cronelid
BY
his ATTORNEY

Feb. 23, 1965   P. H. CRONELID   3,170,310
HEAT OPERATED ABSORPTION REFRIGERATOR
Filed Aug. 29, 1961   3 Sheets-Sheet 2

INVENTOR.
Paul Herbert Cronelid
BY
Edmund A. [Signature]
his ATTORNEY

Feb. 23, 1965   P. H. CRONELID   3,170,310
HEAT OPERATED ABSORPTION REFRIGERATOR
Filed Aug. 29, 1961   3 Sheets-Sheet 3

INVENTOR.
Paul Herbert Cronelid
BY
Edmund A. (signature)
his ATTORNEY

United States Patent Office
3,170,310
Patented Feb. 23, 1965

3,170,310
HEAT OPERATED ABSORPTION REFRIGERATOR
Paul Herbert Cronelid, Stockholm, Sweden, assignor to Aktiebolaget Electrolux, Stockholm, Sweden, a corporation of Sweden
Filed Aug. 29, 1961, Ser. No. 134,677
Claims priority, application Sweden, Sept. 24, 1960, 9,144/60
1 Claim. (Cl. 62—490)

My invention relates to heat operated refrigerators of the absorption type.

It is an object of my invention to effect an improvement in refrigerators of this type, particularly to provide new arrangements for insulating the vapor-expulsion unit or generator from the surroundings.

Another object is to provide such new arrangements in which a refrigerator cabinet is utilized to form at least a major part of the housing for the generator or vapor-expulsion unit.

A further object is to provide such new arrangements in which the walls of the refrigerator cabinet are utilized to provide a housing or casing for the generator or vapor-expulsion unit and the cabinet and the generator are insulated by a single body of insulation.

A still further object is to foam a plastic insulation in situ in such new arrangements whereby the generator housing is integrally united to the cabinet insulation and all of the parts of the refrigerator are insulated by a single body of insulation.

The novel features which I believe to be characteristic of my invention are set forth with particularity in the claim. The invention, both as to organization and method, together with the above and other objects and advantages thereof, will be better understood by reference to the following description taken in connection with accompanying drawings forming a part of this specification, and in which:

Figure 1:
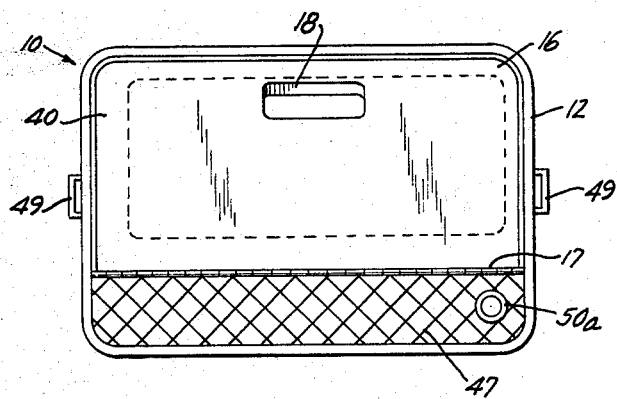
FIG. 1 is a top plan view of a refrigerator embodying my invention.
Figure 2:
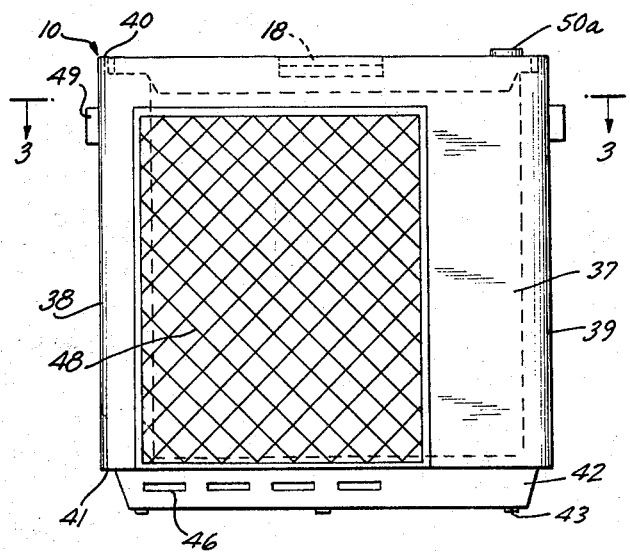
FIG. 2 is a rear elevational view of the refrigerator shown in FIG. 1.

Referring to FIGS. 1 to 4, the invention is shown in connection with a portable refrigerator of small size which comprises a cabinet 10 having an inner shell or liner 11 which may be formed of suitable plastic material and arranged to be supported within an outer metal shell 12 and insulated therefrom with suitable insulation 14. The inner shell 11 defines a thermally insulated food storage space 15 having a top opening which is adapted to be closed by a removable closure or lid 16 hinged at 17 and provided with a handle 18. The storage space 15 is arranged to be cooled by a cooling element or evaporator 19 which is disposed therein.

The cooling element 19 desirably forms a part of refrigeration apparatus 20 of an absorption type containing an inert gas or pressure equalizing agent. In such apparatus, refrigerant vapor expelled from solution in a generator 21 by heating flows through a conduit 22 to a condenser 23 in which it is liquefied. The liquid refrigerant, such as ammonia, for example, flows from condenser 23 through a conduit 24 to the cooling element 19 in which the liquid evaporates and diffuses in the presence of an inert gas, such as hydrogen, for example, thereby producing a refrigerating effect.

The resulting gas mixture of refrigerant and inert gas flows downward from the upper end of cooling element 19 through an outer passage of a gas heat exchanger 25, conduit 26 and absorber vessel 27 to the lower end of absorber coil 28 where refrigerant vapor is absorbed into liquid absorbent, such as water, which enters through a conduit 29. Inert gas weak in refrigerant is returned to the lower end of cooling element 19 from the upper end of absorber coil 28 in a path of flow including an inner passage of gas heat exchanger 25. Absorption liquid enriched in refrigerant in the absorber 28 passes into the absorber vessel 27 and flows therefrom through a conduit 30 and an inner passage of a liquid heat exchanger 31 to generator 21 where it is heated and refrigerant vapor again is expelled out of solution. The weakened absorption liquid from which refrigerant has been expelled as vapor is conducted from generator 21 to the absorber 28 through the outer passage of liquid heat exchanger 31 and conduit 29 to again absorb refrigerant vapor.

In order to simplify the drawings, parts of the refrigeration apparatus have been omitted and other parts have been shown only diagrammatically, a complete illustration of the apparatus not being necessary for an understanding of my invention. The parts of refrigeration apparatus of the absorption type, whose relative positions are substantially fixed, usually are formed of iron or steel when ammonia and water are employed as the refrigerant and liquid absorbent, respectively. Therefore, the piping for the cooling element 19, which is connected by the gas heat exchanger 25 and conduits to other parts of the refrigeration apparatus and forms a unitary part thereof, may be formed of such ferrous metal.

Figure 3:
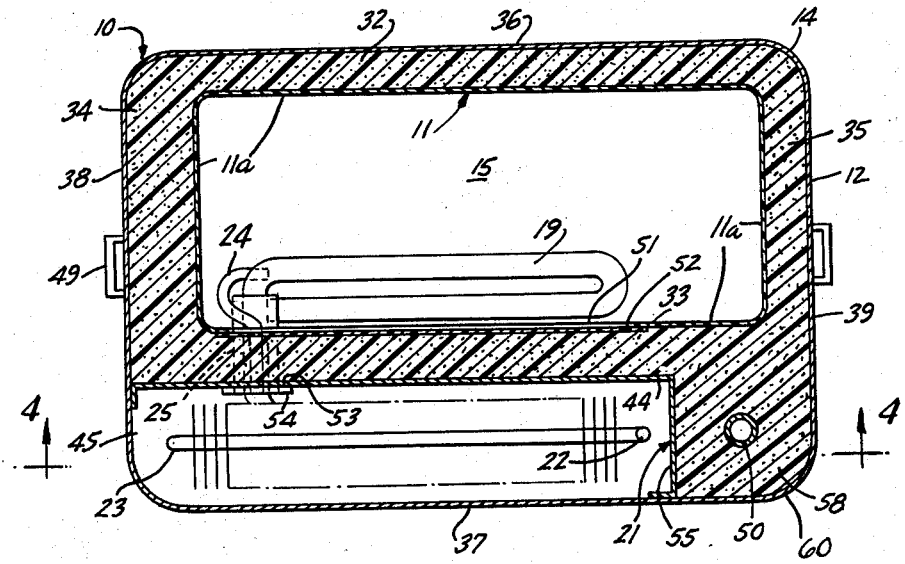
FIG. 3 is a horizontal sectional view taken at line 3—3 of FIG. 2.

The refrigerator cabinet 10 is of rectangular shape having long front and rear thermally insulated walls 32 and 33, respectively, and shorter connecting end thermally insulated walls 34 and 35. The outer shell 12 comprises front and rear sides 36 and 37, lateral sides 38 and 39, and top and bottom portions 40 and 41. A base 42 having feet 43 is fixed to the bottom portion 41 of cabinet 10. A plate 44 forms the outside panel for a major part of the rear insulated wall 33 of the cabinet, as shown in FIG. 3. The lateral sides 38 and 39 extend rearward beyond the plate 44 to provide a vertical compartment 45 in which parts of the refrigeration apparatus are housed. During operation of the refrigeration apparatus, natural draft circulation of air is induced to effect air-cooling of the absorber 28 and condenser 23, such cooling air flowing upward through openings 46 in the base 42 and passing through an apertured removable grill 47 at the rear part of the top panel portion 40 of the cabinet. The rear side 37 of the outer shell 12 may be provided with an apertured removable grill 48 which extends from the vicinity of the lateral side 38 to the generator 19 so that cooling air can pass therethrough into the vertical compartment 45 to promote air-cooling of the refrigeration apparatus.

The portable refrigerator illustrated in the drawing and described above being of relatively small size may be carried in the trunk compartment of an automobile, for example. The refrigerator may be provided with handles 49 at the lateral sides 38 and 39 or it may be carried with the aid of straps (not shown) fastened to the handles 49. The generator 21 is adapted for electrical and gas operation. Accordingly, the generator 21 may be provided with an electrical heating element (not shown) having conductors extending exteriorly of the generator which are adapted to be connected to a source of electrical supply, as to the storage battery of an automobile, for example.

The generator 21 is also provided with an upright heating flue 50, the lower end of which projects downward from the bottom of the generator and is arranged to be heated by a gas burner (not shown). Small containers of compressed combustible gas, such as liquid propane, for example, which are either refillable or of the throw-away type, may be employed as the source of gaseous fuel for operating the refrigerator with gas when camping or picnicking, for example, and a source of electrical supply is not available. The upper end of the heating flue 50 projects upward from the top of the generator 21 and is in communication with a flue extension pipe or air dilution flue 50a which projects upward in the apparatus compartment 45 with its upper end passing through the apertured grill 47 and substantially flush with the top portion 40 of the cabinet 10.

The inner shell 11 may be provided with an oblong opening 51, as shown in FIG. 3, through which the cooling element 19 may be inserted to position it within the storage space 15. The opening 51 may then be closed in any suitable manner, as by a plate 52, which is fixed in any suitable manner to the inner shell 11. The outer casing 12 and rear plate 44 are then positioned over the inner shell 11 and refrigeration apparatus, the rear plate 44 having a vertically extending slit 53 which extends upward from its bottom edge to the height of the horizontal branch of conduit 24 and gas heat exchanger 25 and receives these parts. Thereafter, the slit 53 is closed by a plate 54 fixed to the rear plate 44. If desired, the insulation 14 may be formed in situ in the thermally insulated walls defining the storage space 15 to firmly anchor parts of the refrigeration apparatus and cabinet 10 to one another. A foamed plastic like polyurethane is an example of an insulation which may be formed in situ in the thermally insulated walls.

Figure 4:
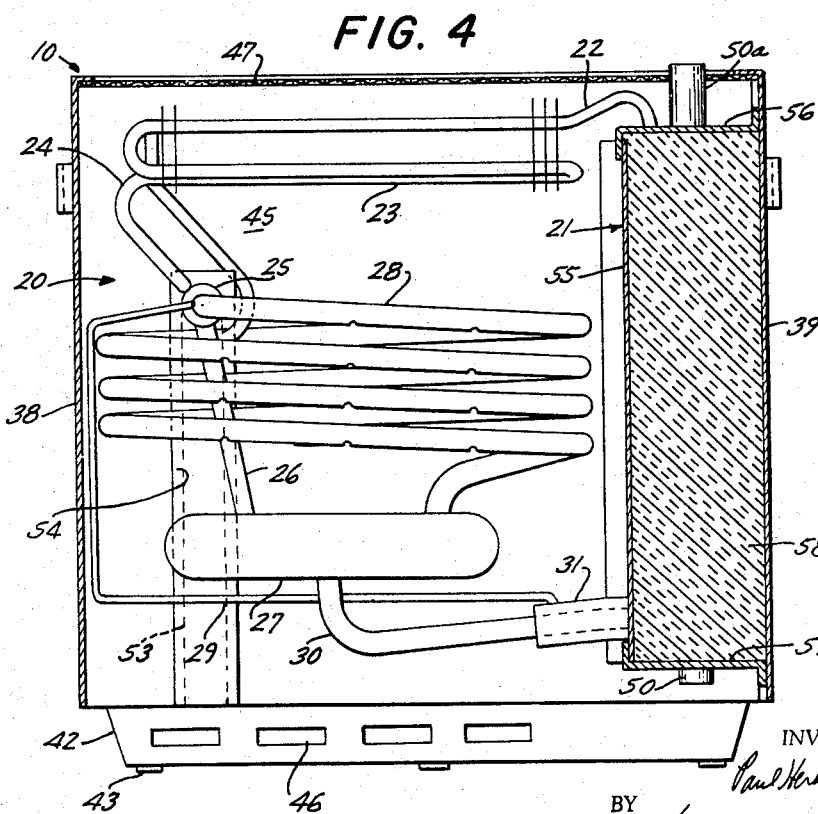
FIG. 4 is a vertical sectional view taken at line 4—4 of FIG. 3.

The vapor-expulsion unit or generator 21 of FIGS. 3 and 4 is formed of piping (not shown) to provide a compact bundle or cluster of parts which is elongated in the vertical direction and is relatively narrow in horizontal cross-section. The heating flue 50 is heat conductively connected to one or more of the generator parts and can serve not only as a flue for heating gases when the refrigerator is operated by a gas burner but also as a heating tube in which an electrical heating element can be positioned. In order to reduce radiation heat losses and conserve heat, it is usually the practice to embed the parts of the generator or vapor-expulsion unit in a body of insulation having a separate metal shell or casing which is a unitary component of the refrigeration apparatus and separate from the refrigerator cabinet.

In accordance with my invention, in order to provide a portable heat operated refrigerator of the absorption type having a minimum weight for a refrigerator of a given size and capacity, the cabinet 10 is utilized to form at least a major part of the housing for the generator 21. In the preferred embodiment illustrated and being described, the abutting end portions of the rear side 37 and lateral side 39 of the outer shell 12 form two vertical sides of a housing 10a for the generator 21 which forms a bulge 60 at the juncture of the insulating walls 33 and 35 of the cabinet 10. A plate 55 which is parallel to the lateral side 39 and extends from rear plate 44 to the rear side 37 and is fixed to the side 37 forms the third vertical side of the generator housing. As shown in FIG. 4, the generator housing includes apertured top and bottom plates 56 and 57 through which the upper and lower ends of heating flue 50 extend. The piping and heating flue 50 in generator 21 are embedded in a body of insulation 58 retained in the housing of generator 21.

Since the walls of cabinet 10 are utilized to form three sides of the housing for generator 21, a substantial saving in the weight of the refrigerator is effected, which is especially important in a portable heat operated refrigerator which must be carried from place to place in its normal use.

Figure 5:
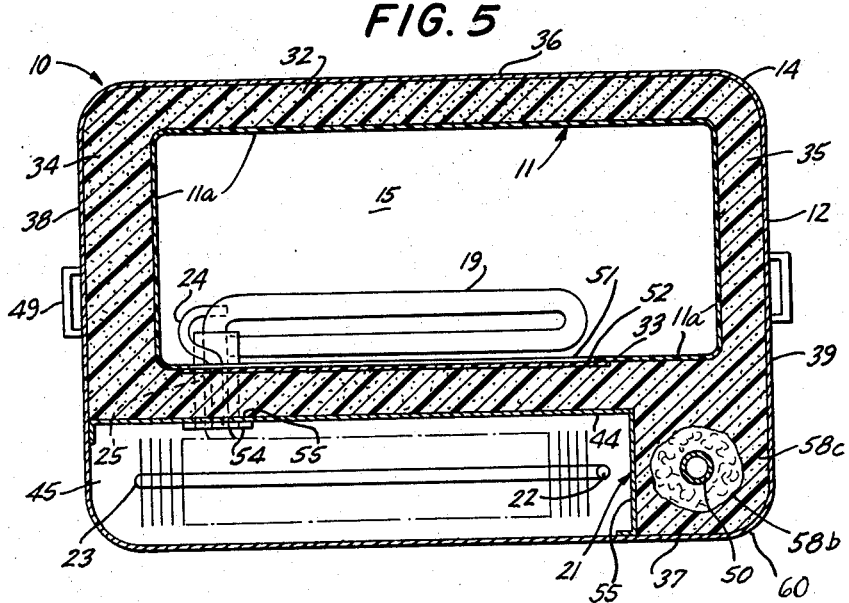
FIG. 5 is a horizontal sectional view similar to FIG. 3 illustrating another embodiment of the invention.

FIG. 5 is a view similar to FIG. 3 in which like parts are referred to by the same reference numerals. In both FIGS. 3 and 5 the rear plate 44 of the rear insulated wall 33 is L-shaped and includes a short arm or section which serves as the side wall 55 of the generator housing. The bottom edge of the wall section 55 is above the bottom edge of the rear plate 44, and the top edge of the wall section 55 is below the top edge of the rear plate 44. Hence, the plates 56 and 57 in FIG. 4 are L-shaped with parts thereof forming the apertured top and bottom, respectively, of the generator housing and other parts thereof disposed in the plane of rear plate 44 and serving as extensions thereof to bridge the gaps between the lateral side 39 of the outer shell 12 and the junction of the parts 44 and 55 of the L-shaped rear plate.

In FIGS. 3 and 5 the same insulation 14 is employed for the generator housing 21 and the insulated walls 33 and 35 of the cabinet 10. In the embodiment of FIG. 3, a suitable plastic, such as a polyurethane plastic, for example, is foamed in situ after the cabinet is made airtight by sealing all of the joints by a suitable sealing compound. In such case, the insulation 58 in the generator housing 21 and the insulation 14 in the walls of the cabinet 10 are integrally united to one another and a single body of insulation is employed for the cabinet walls and the generator housing. A foamed plastic like polyurethane plastic possesses the advantage that it adheres very strongly to the surfaces defining the insulating spaces and completely fills the insulation spaces to provide an insulation that is extremely efficient and is self-sustaining and possesses significant mechanical strength whereby a portable refrigerator of small size is provided that is rigid and utilizes the insulation to hold the inner liner 11 within the outer shell 12.

In FIG. 5, the generator piping and the heating flue 50 may be wrapped with an inner layer 58b of an insulation like rock wool or glass wool, for example, and insulation 58c like polyurethane plastic may be foamed in situ about the inner insulation layer 58b and the walls of the cabinet 10. Hence, in FIG. 5 the outer layer 58c of the insulation in the generator housing 21a is integrally united to the insulation formed in situ in the insulated walls 33 and 35 adjacent to the generator housing 21a. In view of the foregoing, it will now be understood that the cabinet 10 comprises an outer shell 12, spaced first and second upstanding exterior sides 36 and 37, respectively, which are substantially parallel to one another, and spaced third and fourth upstanding exterior sides 38 and 39, respectively, which are substantially parallel to one another and are joined to the first and second sides 36 and 37 and substantially perpendicular thereto. The cabinet 10 has an inner liner 11 defining the storage space 15 and a closure member 16 therefor, the liner having surfaces defining the inner sides 11a of the cabinet 10.

An upstanding L-shaped member 44, 55 is disposed between the first and second exterior sides 36, 37 of the outer shell 12 and includes a first wall section 44 which is substantially parallel to the second exterior side 37 and spaced therefrom and a second wall section 55 which is transverse to the first wall section 44 and extends therefrom to the second exterior side 37 at a region thereof which is removed from the fourth exterior side 39. The L-shaped member 44, 55 and abutting second and third exterior sides 37, 38 define the apparatus space 45 in which the air-cooled condenser 23 and absorber 28 are disposed.

The generator 21 is disposed in the corner of the outer shell defined by the abutting end portions of the second and fourth exterior sides 37, 39, the generator being disposed at the opposite side of the second wall section 55 of the L-shaped member 44, 55 from the apparatus space 45.

The cabinet 10 has spaces for the thermal insulation between three of the inner sides 11a and the first, third and fourth exterior sides 36, 38 and 39 of the outer shell 12 and between a fourth of the inner sides 11a and the first and second sections 44, 55 of the L-shaped member and the portion of the third exterior side 37 between the second wall section 55 and the fourth exterior side, and thermal insulation 14, 58 in the spaces.

The inner sides 11a, exterior sides 36, 38, 39, the L-shaped member 44, 55 and portion of the exterior side 37, and thermal insulation 14, 58 in the spaces therebetween define thermally insulated walls 32, 33, 34, 35 having a bulge 60 at the juncture of the second and fourth exterior sides 37, 39. The thermal insulation 58 in the bulge 60 envelops the generator 21 and joins the insulation 14 in the thermally insulated walls 33, 35 adjacent thereto and is retained within the abutting end portions of the second and fourth exterior sides 37, 39 and the second wall section 55 of the L-shaped member 44, 55.

With this arrangement a substantial saving in the weight of the refrigerator is realized which is especially important in a portable heat-operated refrigerator, as explained above.

While I have shown and described several embodiments of my invention, it will be apparent that modifications and changes may be made without departing from the spirit and scope of the invention, as pointed out in the following claim.

I claim:

The combination with a continuous absorption refrigeration system of the pressure-equalized type containing refrigerant, inert gas and absorption liquid, the system comprising a plurality of parts including a generator (21), absorber (28), condenser (23) and cooling element (19) connected for circulation of refrigerant, inert gas and absorption liquid, of (a) a cabinet (10) having an outer shell (12) including spaced first and second upstanding exterior sides (36, 37) substantially parallel to one another and spaced third and fourth upstanding exterior sides (38, 39) substantially parallel to one another which are joined to the first and second sides (36, 37) and substantially perpendicular thereto, (b) the cabinet (10) having an inner liner (11) defining a storage space (15) provided with an opening and a closure member (16) therefor, the liner (11) having surfaces defining the inner sides (11a) of the cabinet (10), (c) an upstanding L-shaped member (44, 55) which is disposed between the first and second exterior sides (36, 37) of the outer shell (12) and includes a first wall section (44) substantially parallel to the second exterior side (37) and spaced therefrom and a second wall section (55) which is transverse to the first wall section (44) and extends therefrom to the second exterior side (37) at a region thereof removed from the fourth exterior side (39), (d) the L-shaped member (44, 55) and abutting second and third exterior sides (37, 38) defining an apparatus space (45), (e) the condenser (23) and absorber (28) being air-cooled and disposed in the apparatus space (45) and the cooling element (19) being arranged to effect cooling of the storage space (15) and the generator (21) being disposed in the corner of the outer shell (12) defined by the abutting end portions of the second and fourth exterior sides (37, 39), the generator (21) being disposed at the opposite side of the second wall section (55) of the L-shaped member (44, 55) from the apparatus space (45), (f) the cabinet (10) having spaces for thermal insulation between three of the inner sides (11a) and the first, third and fourth exterior sides (36, 38 and 39) of the outer shell (12) and between a fourth of the inner sides (11a) and the first and second wall sections (44, 55) of the L-shaped member and the portion of the third exterior side (37) between the second wall section (55) and the fourth exterior side (39), and thermal insulation (14, 58) in the last-mentioned spaces, (g) the inner sides (11a), exterior sides (36, 37, 38, 39), L-shaped member (44, 55) and thermal insulation (14, 58) in the spaces therebetween defining thermally insulated walls (32, 33, 34, 35) having a bulge (60) at the juncture of the second and fourth exterior sides (37, 39), and (h) the thermal insulation (58) in the bulge (60) enveloping the generator (21) and joining the insulation (14) in the thermally insulated walls (33, 35) adjacent thereto and being retained within the abutting end portions of the second and fourth exterior sides (37, 39) and the second wall section (55) of the L-shaped member (44, 55).

References Cited in the file of this patent

UNITED STATES PATENTS

| | | |
|---|---|---|
| 2,400,215 | Smellie | May 14, 1946 |
| 2,794,331 | Kogel | June 4, 1957 |
| 2,926,504 | Hellinger | Mar. 1, 1960 |
| 2,936,598 | Gould | May 17, 1960 |
| 3,018,638 | Winkler | Jan. 30, 1962 |
| 3,065,609 | West | Nov. 27, 1962 |

FOREIGN PATENTS

| | | |
|---|---|---|
| 827,747 | Great Britain | Feb. 10, 1960 |
| 1,031,210 | France | Mar. 18, 1953 |